(12) United States Patent
Xiao et al.

(10) Patent No.: US 12,469,113 B2
(45) Date of Patent: Nov. 11, 2025

(54) DENOISING METHOD BASED ON MULTISCALE DISTRIBUTION SCORE FOR POINT CLOUD

(71) Applicants: China Jiliang University, Zhejiang (CN); ZHEJIANG UNIVERSITY OF TECHNOLOGY, Zhejiang (CN)

(72) Inventors: Gang Xiao, Zhejiang (CN); Jiawei Lu, Zhejiang (CN); Qibing Wang, Zhejiang (CN); Chen Li, Zhejiang (CN); Hao Hu, Zhejiang (CN); Junbo Yao, Zhejiang (CN)

(73) Assignees: China Jiliang University, Zhejiang (CN); ZHEJIANG UNIVERSITY OF TECHNOLOGY, Zhejiang (CN)

( * ) Notice: Subject to any disclaimer, the term of this patent is extended or adjusted under 35 U.S.C. 154(b) by 294 days.

(21) Appl. No.: 18/366,604

(22) Filed: Aug. 7, 2023

(65) Prior Publication Data
US 2024/0296528 A1 Sep. 5, 2024

(30) Foreign Application Priority Data
Mar. 1, 2023 (CN) .......................... 202310184967.9

(51) Int. Cl.
*G06T 5/70* (2024.01)
*G06T 5/60* (2024.01)

(52) U.S. Cl.
CPC .................. *G06T 5/70* (2024.01); *G06T 5/60* (2024.01); *G06T 2207/10028* (2013.01)

(58) Field of Classification Search
CPC ... G06T 2207/10028; G06T 5/60; G06T 5/70; G06T 2207/10029
USPC ......................................................... 382/260
See application file for complete search history.

(56) References Cited

U.S. PATENT DOCUMENTS

2021/0366203 A1* 11/2021 Huang ..................... G06T 7/60
2023/0306559 A1* 9/2023 Wang ...................... G06T 5/70

* cited by examiner

Primary Examiner — Kenny A Cese
(74) Attorney, Agent, or Firm — JCIPRNET

(57) ABSTRACT

A denoising method based on a multiscale distribution score for a point cloud includes: constructing a two-layer network model based on multiscale perturbation and point cloud distribution, where the two-layer network model includes a feature extraction module for extracting a feature of the point cloud and a displacement prediction module for predicting a displacement of a noise point; constructing a point cloud noise model for improving a denoising effect and retaining a sharp feature and avoiding reducing quality of point cloud data; extracting a global feature h by inputting the point cloud data into the feature extraction module; iteratively learning the displacement of the noise point by the displacement prediction module according to a feature obtained by the feature extraction unit; and defining a loss function of network training, and completing convergence under the condition that the loss function reaches a set threshold or a maximum number of iterations.

9 Claims, 9 Drawing Sheets

| Gaussian Noise | Noisy | TD | P2F errors/×10⁻² PointCleanNet | Pointfilter | MSPoint |
|---|---|---|---|---|---|
| | | | casting | | |
| 0.3% | 2.389 | 3.258 | 2.369 | 1.870 | 1.774 |
| 0.5% | 3.915 | 3.792 | 3.823 | 4.387 | 3.668 |
| 1.0% | 13.27 | 14.18 | 9.337 | 9.701 | 8.487 |
| | | | Cube | | |
| 0.3% | 2.675 | 1.934 | 1.430 | 1.309 | 0.903 |
| 0.5% | 4.572 | 2.187 | 2.028 | 1.726 | 1.499 |
| 1.0% | 15.92 | 3.066 | 2.273 | 2.837 | 1.968 |
| | | | fandisk | | |
| 0.3% | 2.446 | 3.402 | 1.726 | 1.351 | 0.745 |
| 0.5% | 4.473 | 3.776 | 3.222 | 2.878 | 2.182 |
| 1.0% | 14.93 | 5.771 | 4.353 | 3.884 | 3.598 |

FIG.8

DENOISING METHOD BASED ON MULTISCALE DISTRIBUTION SCORE FOR POINT CLOUD

CROSS-REFERENCE TO RELATED APPLICATION

This application claims the priority benefit of China application serial no. 202310184967.9, filed on Mar. 1, 2023. The entirety of the above-mentioned patent application is hereby incorporated by reference herein and made a part of this specification.

TECHNICAL FIELD

The present invention belongs to the field of three-dimensional point cloud denoising, and relates to a denoising method based on a multiscale distribution score for a point cloud.

BACKGROUND

With technological advances, a three-dimensional point cloud of a detected object is readily available with a laser scanner or through drone tilt photography. Point cloud data draw increasing attention of researchers accordingly, and gradually become an essential three-dimensional data representation form for a computer vision neighborhood. The point cloud, composed of discrete three-dimensional points irregularly sampled continuously from a surface, is widely used in geometric processing, autonomous driving, model three-dimensional reconstruction, etc. But, the quality of the point cloud is susceptible to influence of environment, experience, light, etc. and a point cloud directly generated by the laser scanner or an oblique photography apparatus inevitably has noise. The noise in the point cloud is likely to significantly affect a downstream task, such as rendering, three-dimensional reconstruction and semantic segmentation. In view of this, efficient point cloud denoising is necessary for effectively using the three-dimensional point cloud data.

The point cloud denoising is to remove or repair noise as efficiently as possible while geometric features of the point cloud data are kept, and to improve effects of subsequent reconstruction, segmentation, classification, etc.

The rapid development of deep learning technology provides numerous new research ideas for point cloud denoising. The point cloud data are different from two-dimensional images in their features of disorder, being unstructured, uneven distribution and vast amount of data, which makes it difficult to apply directly an image denoising algorithm based on deep learning to the field of point cloud denoising. It is a challenge to learn features from a messy point cloud. A mainstream denoising method based on deep learning for a point cloud takes a nearest distance between a noise point and a noise-free point as an objective function of iterative training of a neural network, then predicts a displacement of the noise point, and performs denoising by applying an inverse displacement to the noisy point cloud. However, a training process of the method merely considers a distance relationship between the noise point and a clean point separately, which leads to inaccurate estimation of the displacement, and value abnormality, shrinkage, aggregation, etc. of a denoised point cloud.

SUMMARY

In order to overcome shortcomings of the prior art, the present invention provides a denoising method based on a multi-scale distribution score for a point cloud, and provides a new denoising network MSPoint based on a point cloud distribution score (that is, a gradient of a point cloud logarithmic probability function). The network mainly composed of a feature extraction module and a displacement prediction module. The feature extraction module inputs a neighborhood of a point cloud, and adds multiscale noise perturbation (MNP) to data to enhance an anti-noise performance of MSPoint, and make an extracted feature have a stronger expression capacity. The displacement estimation module iteratively learns a displacement of the noise point according to a score predicted by the score estimation unit (SEU). According to the present invention, on the basis of retaining a sharp feature of the point cloud, excellent denoising effects can be achieved on noisy point cloud models with different noise levels and different features.

A technical solution used by the present invention for solving the technical problem is as follows:

A denoising method MSPoint based on a multi-scale distribution score for a point cloud includes:

step 1: constructing a two-layer network model based on an idea of multiscale perturbation and point cloud distribution, where the two-layer network model includes a feature extraction module for extracting a feature of the point cloud and a displacement prediction module for predicting a displacement of a noise point;

step 2: constructing a point cloud noise model for improving a denoising effect and retaining a sharp feature and avoiding reducing quality of point cloud data;

step 3: extracting a global feature h by inputting the point cloud data into the feature extraction module; and specifically, preprocessing the point cloud data, enhancing an anti-noise performance of a network by adding multiscale noise perturbation to processed point cloud data, and extracting, with Encoder, the global feature of the point cloud by the feature extraction module;

step 4: iteratively learning the displacement of the noise point by the displacement prediction module according to a feature obtained by the feature extraction unit; and step 5: defining a loss function of network training, and completing convergence under the condition that the loss function reaches a set threshold or a maximum number of iterations.

Further, in step 1, the feature extraction module first preprocesses a neighborhood of an input noisy point cloud, and then the anti-noise performance of the network is enhanced through the multiscale noise perturbation, so as to make an extracted feature have a stronger expression capacity; and a displacement estimation module of the displacement prediction module obtains a distribution score of a neighborhood point cloud according to a score estimation unit, considers a position of each point, further covers a neighborhood of the point, and finally completes a denoising process by iteratively learning the displacement of the noise point; where the neighborhood point cloud refers to a set of data that have a distance less than a specific distance from a selected point in current point cloud data;

the point cloud distribution refers to that point clouds scattered in a certain area obey a distribution function, where the function shows statistical regularity of a random point cloud; and the multiscale perturbation refers to use of multiscale isotropic Gaussian noise with a mean value of 0 to interfere with the data, so as to make the extracted feature have the stronger expression capacity.

Further, step 2 includes:

step (2.1), regarding in the present invention a noise-free point cloud $Y=\{y_i\}_{i=1}^{M}$ as a set of samples p(y) of three-dimensional distribution p supported by a two-dimensional manifold, deducing p(y)→∞ under the condition that the noise point y is just on the two-dimensional manifold; and assuming that noise follows distribution n, for avoiding reducing the number of point clouds in the denoising process, modeling the noisy point cloud $X=\{x_i\}_{i=1}^{M}$ as shown in the following formula:

$$X = \{x_i = y_i + n_i\}_{i=1}^{M}$$

where M represents the number of point clouds, $n_i$ represents a component of noise distribution n, $x_i$ represents a component of a noisy point cloud X, and $y_i$ represents a component of s noise-free point cloud Y; and the two-dimensional manifold refers to a compact topological space in a two-dimensional space, and each point in the topological space is an interior point; and step (2.2), in order to guide a denoising effect in an overall trend, regarding in the present invention a probability density function q(x) of the noisy point cloud X as a convolution (p*n)(x) between a point cloud distribution p and the noise distribution n, and simultaneously taking derivatives of both distributions, where under the condition that n equals 0, a noise-free point cloud Y from a noise-free distribution p is just located at q:

$$q(x) := (p*n)(x) = \int p(y)n(x-y)dy$$

where the probability density function of the noisy point cloud represents a probability that the noise point falls within a certain specified range; and the convolution refers to a mathematical operation that generates a third function from two functions, and is a special integral transformation in essence.

Further: step 3 includes:

step (3.1), preprocessing collected point cloud data to make same into a format that may be directly processed by a neural network;

step (3.2), computing a rotation matrix with principal component analysis (PCA), aligning a point cloud, and guaranteeing invariance of the network;

step (3.3), in order to strengthen the anti-noise performance of the network, obtaining $x_{\sigma_i}$ by adding multi-scale noise perturbation to an input point cloud x, and processing data with perturbation signals separately, where an output of the network is a weighted result of different noise scale processing; and step (3.4), overcoming limitation of a linear mode by adding several hidden layers, mapping the data to different dimensions through multi-layer perceptron (MLP) of shared parameters to help the network extract the point cloud feature, and finally obtaining a potential feature of the point cloud through convolution.

Preferably, step (3.1) includes:

step (3.1.1), considering that a denoising problem of the point cloud is regarded as a local problem, a denoising result of any noise point $x_i$ comes from a local neighborhood $\tilde{X}$ of the point, and a distance between $\tilde{X}$ and $x_i$ does not exceed a given neighborhood radius r:

$$\tilde{X} = \{\tilde{x}_i | d_{ij} <= r\}_{i=1}^{M}$$

where $d_{ij}$ represents a distance between point $x_i(a_i, b_i, c_i)$ and point $x_j(a_j, b_j, c_j)$:

$$d_{ij} = \|x_i - x_j\|_2^2 = \sqrt{(a_i - a_j)^2 + (b_i - b_j)^2 + (c_i - c_j)^2}$$

where $\|\cdot\|_2^2$ represents a distance between two points, and is also referred to as an L2 distance;

step (3.1.2), in order to reduce an amount of computation and effectively adjust an parameter in the network, guaranteeing the number of point clouds in each neighborhood consistent through sampling control, obtaining $\mathbb{X}$ by performing sam(•)sampling on $\tilde{X}$, setting the number of neighborhood point clouds as N, performing a down-sampling operation under the condition that the number of neighborhood point clouds is greater than N, and randomly extracting N points from the neighborhood as network inputs; and performing an up-sampling operation under the condition that the number of neighborhood point clouds is less than N, filling an origin $x_i$, and causing the number of point clouds to be N:

$$\mathbb{X} = sam(\tilde{X}).$$

In step (3.2), the invariance of the network means translation invariance, rotation invariance and scale invariance; the translation invariance means that coordinates of each point are changed by translating the point cloud, but the point cloud may still be identified by the network as the same set of point cloud; the rotation invariance means that coordinates of each point are changed by rotating the point cloud, but the point cloud may still be identified by the network as the same set of point cloud; the scale invariance means that coordinates of each point are changed by scaling the point cloud, but the point cloud may still be identified by the network as the same set of point cloud; and a feature vector means three directions with a maximum projection variance of the point cloud, and may be used as a main feature component of the point cloud, and the step includes:

step (3.2.1), obtaining a covariance matrix C by computing a mean value $(\bar{a}, \bar{b}, \bar{c})$ of coordinates $(a_i, b_i, c_i)$ of each point $x_i$ in $\mathbb{X}$:

$$C = \begin{bmatrix} \sum(ai-\bar{a})^2 & \sum(ai-\bar{a})(b_i-\bar{b}) & \sum(ai-\bar{a})(ci-\bar{c}) \\ \sum(b_i-\bar{b})(ai-\bar{a}) & \sum(b_i-\bar{b})^2 & \sum(b_i-\bar{b})(ci-\bar{c}) \\ \sum(ci-\bar{c})(ai-\bar{a}) & \sum(ci-\bar{c})(b_i-\bar{b}) & \sum(ci-\bar{c})^2 \end{bmatrix}$$

step (3.2.2), computing $v_1$, $v_2$ and $v_3$ by performing singular value decomposition (SVD) on C, where the three feature vectors are orthogonal to each other and are the three directions with the maximum projection variance, and the feature vectors form the rotation matrix R, such that point clouds with different rotation angles are aligned in one direction, and the rotation invariance of the network is achieved:

$$R=[v_1, v_2, v_3]$$

where SVD is used to decompose the matrix, and a matrix element that represents an essential change of the matrix may be obtained;

in step (3.3), the output of the network is the weighted result of different noise scale processing:

$$\hat{x} = \sum_{i=1}^{L} \lambda(i) * f(x_{\sigma_i}), \; x_{\sigma_i} \sim x + N(0, \sigma_i^2 I)$$

where $N(0,\sigma^2 I)$ represents orthonormal distribution with a mean value of 0 and a standard deviation of $\sigma$, $\sim$ represents obedience and $\Sigma$ represents a summation symbol, $f(\bullet)$ represents an output of a denoising result $\hat{x}$ by a trained network, and $\lambda(\bullet)$ represents a weighted value and $\lambda(i)=\sigma_i^2$;

in step (3.4), sharing may reduce a training parameter of the network, MLP includes five convolutional layers and five batch normalization (BN) layers, the point cloud data with a dimension of 500*3 are input by using ReLU as an activation function, and after convolution, a global feature with a dimension of 500*1024 is output; where each convolutional layer in a convolutional neural network are composed of several convolution units, a parameter of each convolution unit is optimized through a backpropagation algorithm, a convolution operation is to extract different features input, a first convolutional layer can merely extract some low-level features such as an edge, a line and an angle, and a multi-layer network can iteratively extract more complex features from the low-level feature;

a convolution kernel is a function for defining a weighted value in the case that under the condition of image processing, an input image is given, a pixel in a small area of the input image becomes a corresponding pixel of an output image after being weighed and averaged;

the BN layer normalizes the input data in order to prevent data distribution in a middle layer from changing, completes a normalization operation by computing a sample mean value and a sample variance and introducing a weight coefficient and a paranoia coefficient, can accelerate a training speed of the network, improve a generalization capacity of the network, and disrupt a training order of samples; and the activation function is a function running on a neuron of an artificial neural network, is responsible for mapping an input of the neuron to an output terminal, and is used for outputting a hidden neuron, and is very important for a neural network model to learn and understand a complex function, and ReLU may output a nonlinear result for the neuron after linear transformation; and step (3.4) includes:

step (3.4.1), outputting a feature with a dimension of 500*64 through 64 1*1 convolutions and the ReLU activation function, and performing the normalization through the BN layer;

step (3.4.2), outputting a feature with a dimension of 500*128 through 128 1*1 convolutions and the ReLU activation function, and performing the normalization through the BN layer;

step (3.4.3), outputting a feature with a dimension of 500*256 through 256 1*1 convolutions and the ReLU activation function, and performing the normalization through the BN layer;

step (3.4.4), outputting a feature with a dimension of 500*512 through 512 1*1 convolutions and the ReLU activation function, and performing the normalization through the BN layer; and step (3.4.5), outputting a feature h with a dimension of 500*1024 through 1024 1*1 convolutions and the ReLU activation function, and performing the normalization through the BN layer.

In step 4, a displacement prediction module first aggregates features of each point through maximum pooling, then regresses to a predicted displacement $\hat{n}$ of the noise point through Decoder, and finally completes the denoising process by making a predicted point $\hat{x}$ close to a noise-free point y through iterative learning according to a score S (x) predicted by the score estimation unit:

$$\{x_i + \hat{n}_i\}_{i=1}^{M} = \{\hat{x}_i\}_{i=1}^{M} \rightarrow \{y_i\}_{i=1}^{M}$$

where Decoder includes a MAX pooling layer and three fully connected layers (FC), in the FC, each node is connected to all nodes of an upper layer, the FC is used to combine features extracted previously, and due to a fully connected feature thereof, the fully connected layer generally have most parameters;

step 4 includes:

step (4.1), compressing and aggregating the extracted global feature h of 500*1024 through MAX pooling to obtain a potential feature with a dimension of 1*1024; where the MAX pooling takes a point with a maximum value in a local acceptance domain, and extracts a corresponding strongest part of the feature to enter a next layer, and the MAX pooling may compress the feature and further enhance the translation invariance, the rotation invariance and the scale invariance;

step (4.2), regressing to the predicted displacement $\hat{n}$ of the noise point from the potential feature through three FCs, where the FC uses BN regularization and a ReLU activation function, and a last layer uses a tan h activation function for restricting $\hat{n}$ to obtain the predicted point $\hat{x}$; and step (4.3), achieving a denoising effect of the point cloud by making the predicted point $\hat{x}$ close to the noise-free point y through iterative learning according to the score S (x) predicted by the score estimation unit.

Preferably, in the step (4.2), the tan h activation function is also referred to as a hyperbolic tangent activation function, has an output mean value of 0, and has a convergence speed faster than a convergence speed of a classical activation function, and the step includes:

step (4.2.1), outputting a vector with a dimension of 1*512 through an FC with 512 neurons and the ReLU activation function, and performing normalization through the BN layer; and step (4.2.2), outputting a vector with a dimension of 1*256 through an FC with 256 neurons and the ReLU activation function, and performing normalization through the BN layer; and step (4.2.3), outputting a vector with a dimension of 1*3 through an FC with 3 neurons and the tan h activation function, where the vector is the displacement of the noise point predicted by the network.

Preferably, the denoising effect of the point cloud in step (4.3) is as follows:

$$\{x_i + \hat{n}_i\}_{i=1}^M = \{\hat{x}_i\}_{i=1}^M \to \{y_i\}_{i=1}^M$$

step (4.3) includes:

step (4.3.1), defining a concept of the score S (x), and a score of noisy point cloud distribution predicted by the score estimation unit, where the score is a gradient of a logarithmic probability function of the point cloud, and may reflect a direction of point cloud denoising on a local basis:

$$S(x) = \nabla_x \log[(p*n)(x)]$$

where $(p*n)(x)$ represents a score of the point cloud or a probability function of the point cloud, $\nabla$ represents a function gradient taking sign, and $\log[(p*n)(x)]$ represents the logarithmic probability function of the point cloud; and $(p*n)(x)$ may measure a noise level of the point cloud, and under the condition that $(p*n)(x)$ reaches a maximum value, the noise point is closest to a clean surface, that is, x is just on the clean surface under the condition that $\nabla_x \log[(p*n)(x)]$ equals 0; and step (4.3.2), inputting, by the score estimation unit, an aggregated feature F composed of a sampling neighborhood $\mathbb{X}$ of x and the global feature h, and outputting the score S (x) of x.

Preferably in step (4.3.2), the score estimation unit is mainly composed of four residual blocks and a final convolutional layer, and an connection of convolution processing of an input layer is added after each residual block to solve the problems such as gradient vanishing and gradient explosion; where the residual block is composed of two convolutional layers and a shortcut connection, and the shortcut connection refers to a shortcut connecting an input to an output, and is equivalent to execution of equivalent mapping without generating an additional parameter; and step (4.3.2) includes:

step (4.3.2.1), defining an actual target score s(x) of an input point x by using a noise-free point cloud Y, and s(x) is defined as a vector from the noise point x to a clean surface:

$$s(x) = NN(x, Y) - x, x \in \mathbb{X}$$

where NN(x, Y) regresses to a point closest to x in Y; and the actual target score refers to an actual score pursued by the score estimation unit, and the predicted score output by the score estimation unit keeps approaching the actual score with training;

step (4.3.2.2), determines an objective function of the score estimation unit, and a training objective function aligns the predicted score S(x) with the actual target score s(x) defined above:

$$\mathcal{L}^{(i)} = \mathbb{E}_{x \sim N(x_i)}\left[\|s(x) - S(x)\|_2^2\right]$$

where $\mathbb{E}$ represents a mathematical expectation; and $N(x_i)$ represents distribution of a neighborhood point cloud of a $i^{th}$ point $x_i$, and means that the objective function not only matches a score predicted in the position $x_i$, but also matches a score in the neighborhood of $x_i$, and therefore helps a prediction process of the network cover a neighborhood of each point; and step (4.3.2.3), in order to enhance robustness and reduce a deviation, constructing a local neighborhood score function $\varepsilon(x)$ with an integrated score function;

$$\varepsilon(x) = \frac{1}{N}\sum_{j=1}^{N} S_j(x), x_j \in \mathbb{X}$$

where $S(x_j)$ represents a score of a $j^{th}$ point $x_j$ in a point cloud neighborhood $\mathbb{X}$.

step 5 includes:

step (5.1), finally predicting a displacement acting on the noise point by the network, and defining a loss function of $L_s$ to make the noisy point cloud closer to a clean surface according to a feature of a distance L2, where the loss is the L2 distance between a point closest to a predicted point and the predicted point in a noise-free point cloud; and $$L_s = \|NN(\hat{x}, Y) - \hat{x}\|_2^2$$

step (5.2), defining a new loss function $L_a$ weighted by a local neighborhood score $\varepsilon(x)$, and measuring the denoising effect from distribution of the point cloud neighborhood rather than merely from a distance of a single point, and therefore causing distribution of a denoised point cloud more uniform and accurate;

$$L_a = \alpha L_s + (1 - \alpha)\sqrt{\varepsilon_x^2 + \varepsilon_y^2 + \varepsilon_z^2}$$

where $L_a$ represents a weighted combination of two loss terms, the local neighborhood score $\varepsilon(x)$ actually predicts a gradient of point cloud distribution, the gradient is a three-dimensional vector, and $$\sqrt{\varepsilon_x^2 + \varepsilon_y^2 + \varepsilon_z^2}$$

is obtained modulo $\varepsilon(x)$.

The beneficial effects of the present invention are mainly as follows: in order to solve the existing problems of point cloud denoising, the new denoising network MSPoint is provided, and the network learns the displacement of the noisy point cloud according to the distribution of the point cloud neighborhood. The feature extraction module creates n obstacle for feature extraction by adding the multiscale noise perturbation, and forces the network to learn a deeper-level and more expressive feature. The displacement prediction module guides a direction of network training by predicting a gradient of the distribution of the noisy point cloud. A training process not only considers the position of each point, but also covers the neighborhood of the point. Aimed at the noisy point cloud models with different noise levels and different features, MSPoint has excellent denoising effects, can well retain the sharp feature of the point cloud and has desirable robustness and the generalization capacity.

BRIEF DESCRIPTION OF THE DRAWINGS

FIG. 8 shows a comparison of denoising results of MSPoint and other methods under a point-to-surface (P2F) error.

DETAILED DESCRIPTION OF THE EMBODIMENTS

The present invention will be further described below with reference to accompanying drawings.

Figure 1:
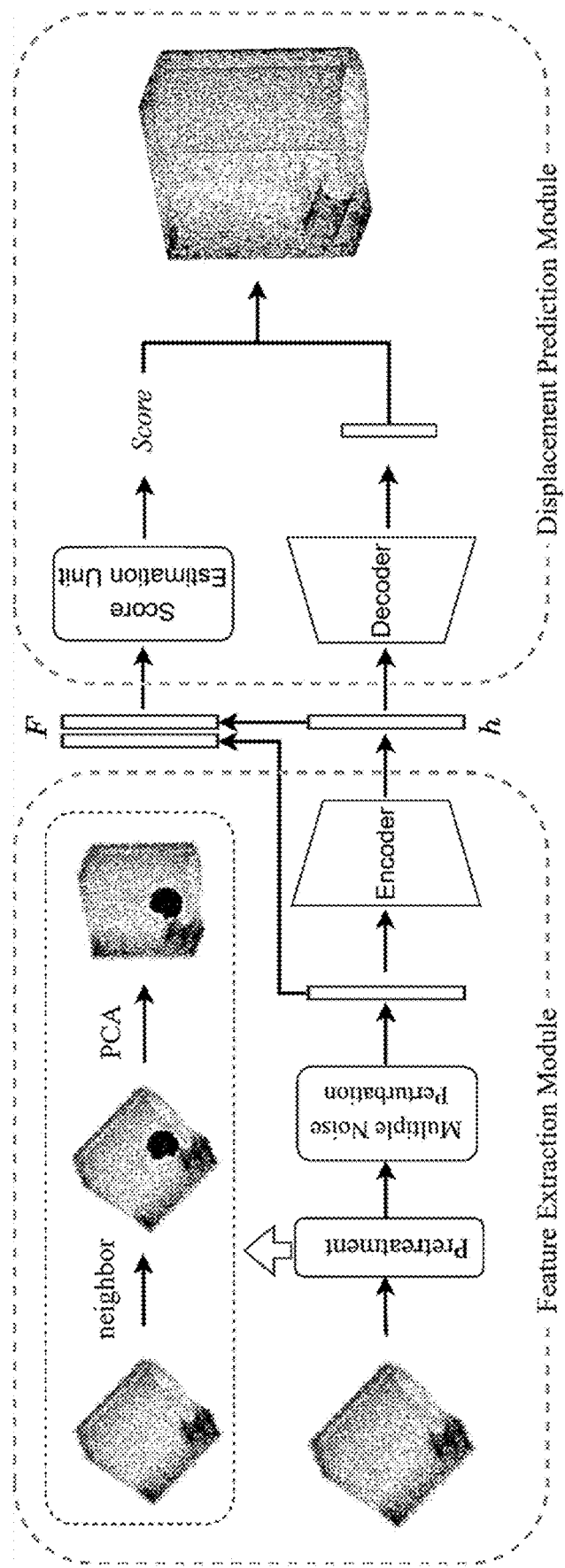
FIG. 1 is a structural diagram of an MSPoint network.
Figure 2:
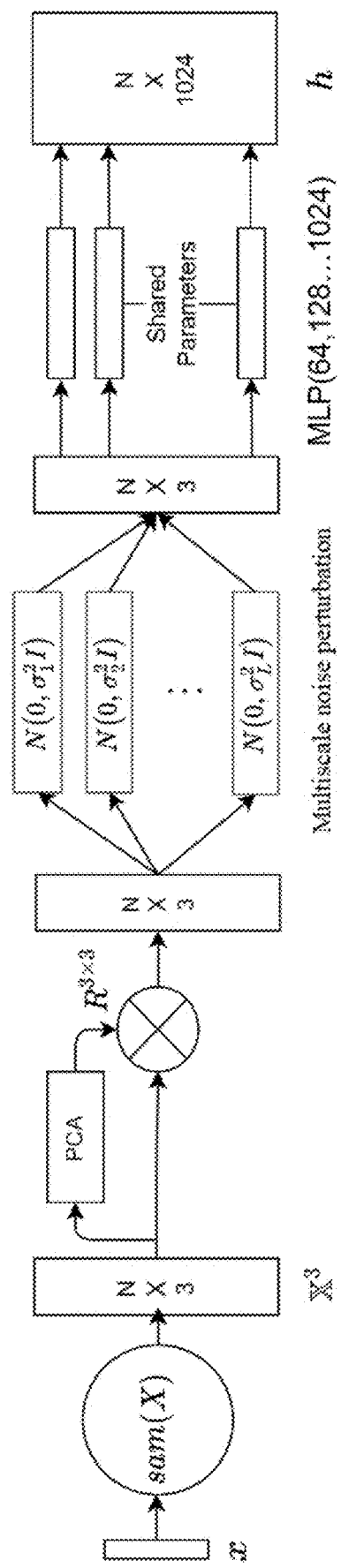
FIG. 2 is a structural diagram of a feature extraction module.
Figure 3:
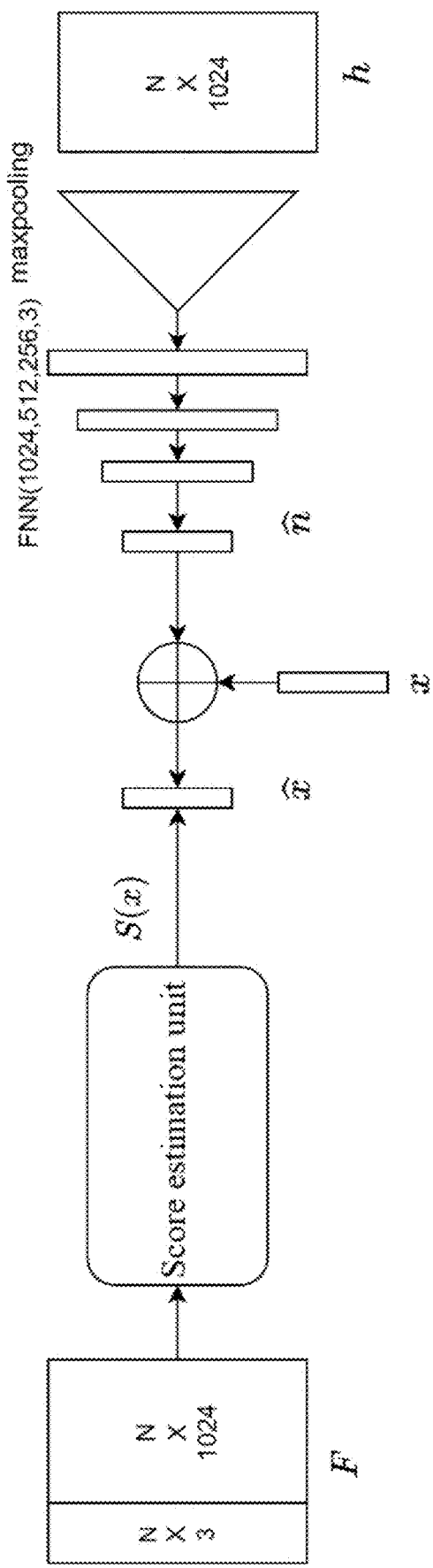
FIG. 3 is a structural diagram of a displacement prediction module.
Figure 4:
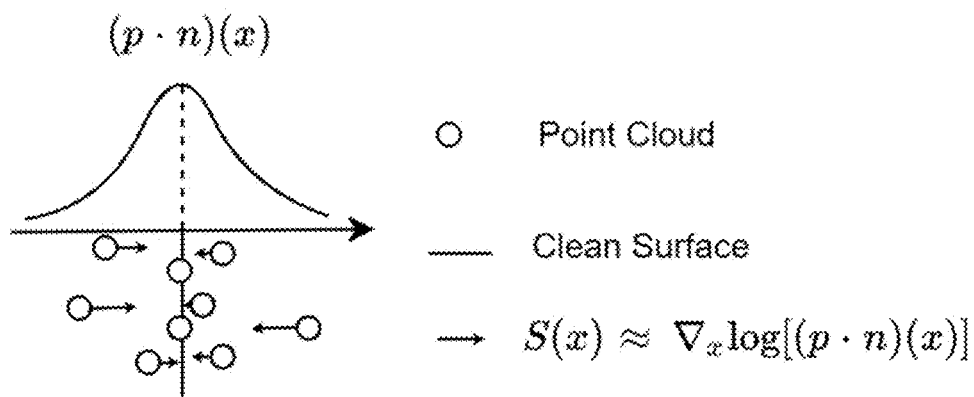
FIG. 4 shows a concept of a point cloud distribution score.
Figure 5:
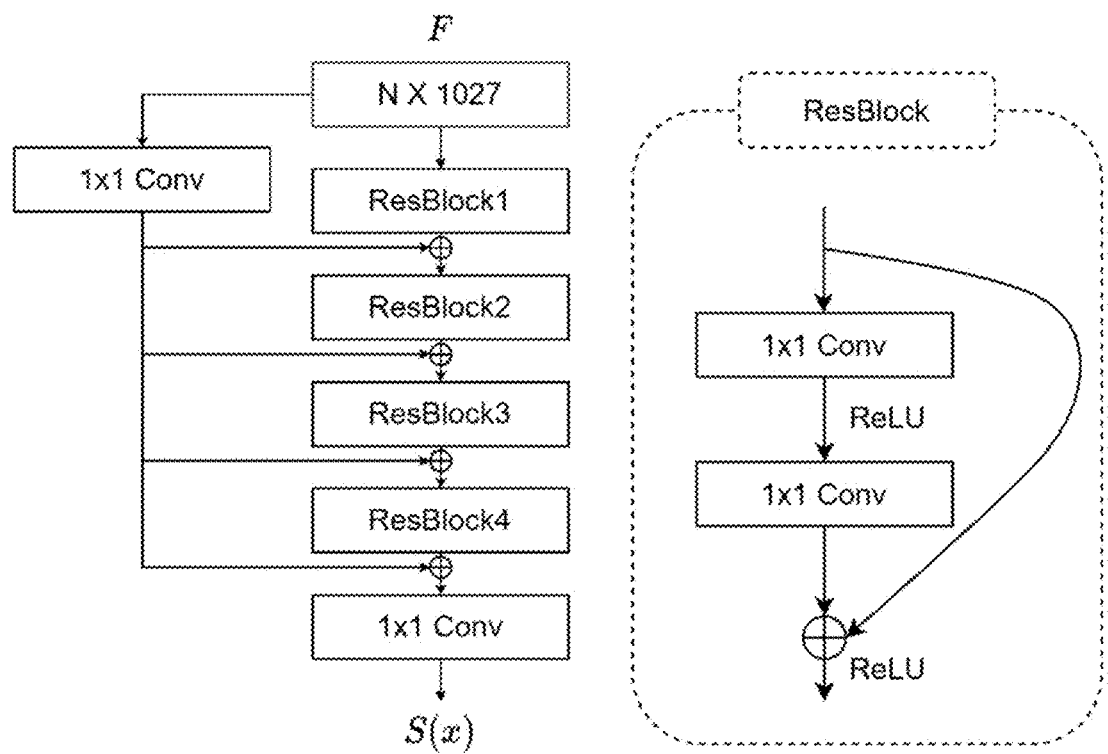
FIG. 5 is a structural diagram of a score estimation unit.
Figure 6:
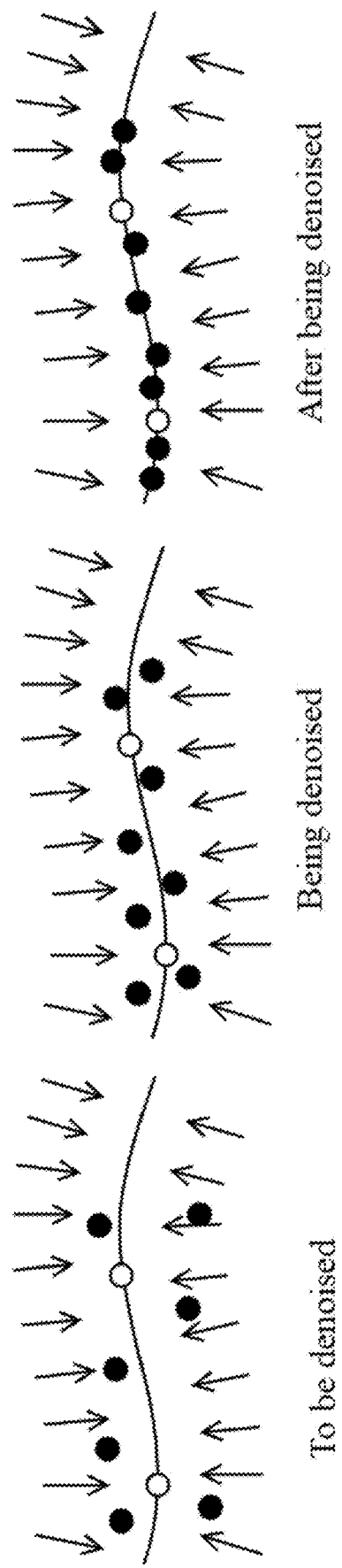
FIG. 6 shows influence of a loss function on a point cloud denoising process.

With reference to FIGS. 1-10, a denoising method MSPoint based on a multi-scale distribution score for a point cloud includes:

step 1: as shown in FIG. 1, a two-layer network model is constructed based on an idea of multiscale perturbation and point cloud distribution, where the two-layer network model includes a feature extraction module for extracting a feature of the point cloud and a displacement prediction module for predicting a displacement of a noise point;

the feature extraction module first preprocesses a neighborhood of an input noisy point cloud, and then the anti-noise performance of the network is enhanced through the multiscale noise perturbation, so as to make an extracted feature have a stronger expression capacity; and a displacement estimation module of the displacement prediction module obtains a distribution score of a neighborhood point cloud according to a score estimation unit, considers a position of each point, further covers a neighborhood of the point, and finally completes a denoising process by iteratively learning the displacement of the noise point; where the neighborhood point cloud refers to a set of data that have a distance less than a specific distance from a selected point in current point cloud data;

the point cloud distribution refers to that point clouds scattered in a certain area obey a distribution function, where the function shows statistical regularity of a random point cloud; and the multiscale perturbation refers to use of multiscale isotropic Gaussian noise with a mean value of 0 to interfere with the data, so as to make the extracted feature have the stronger expression capacity;

step 2: a point cloud noise model is constructed for improving a denoising effect and retaining sharp features and avoiding reducing quality of point cloud data; and the step includes:

step (2.1), a noise-free point cloud $Y=\{y_i\}_{i=1}^{M}$ is regarded as a set of samples p(y) of three-dimensional distribution p supported by a two-dimensional manifold, $p(y)\to\infty$ is deduced under the condition that the noise point y is just on the two-dimensional manifold; and it is assumed that noise follows distribution n, for avoiding reducing the number of point clouds in the denoising process, the noisy point cloud $X=\{x_i\}_{i=1}^{M}$ is modeled as shown in the following formula:

$$X = \{x_i = y_i + n_i\}_{i=1}^{M}$$

where M represents the number of point clouds, $n_i$ represents a component of noise distribution n, $x_i$ represents a component of a noisy point cloud X, and $y_i$ represents a component of s noise-free point cloud Y; and the two-dimensional manifold refers to a compact topological space in a two-dimensional space, and each point in the topological space is an interior point; and step (2.2), in order to guide a denoising effect in an overall trend, a probability density function q(x) of the noisy point cloud X is regarded as a convolution (p*n)(x) between a point cloud distribution p and the noise distribution n, and derivatives of both distributions are simultaneously taken, where under the condition that n equals 0, a noise-free point cloud Y from a noise-free distribution p is just located at q:

$$q(x) := (p*n)(x) = \int p(y)n(x-y)\,dy$$

where the probability density function of the noisy point cloud represents a probability that the noise point falls within a certain specified range; and the convolution refers to a mathematical operation that generates a third function from two functions, and is a special integral transformation in essence;

step 3: a global feature h is extracted by inputting the point cloud data into the feature extraction module; and specifically, As designed in FIG. 2, the feature extraction module preprocesses the point cloud data, enhances an anti-noise performance of a network by adding multiscale noise perturbation to processed point cloud data, and extracts, with Encoder, the global feature of the point cloud; where the Encoder is composed of multilayer perceptron (MLP);

step (3.1), collected point cloud data are preprocessed to make same into a format that may be directly processed by a neural network, and the step includes;

step (3.1.1), it is considered that a denoising problem of the point cloud is regarded as a local problem, a denoising result of any noise point $x_i$ comes from a local neighborhood $\tilde{X}$ of the point, and a distance between $\tilde{X}$ and $x_i$ does not exceed a given neighborhood radius r:

$$\tilde{X} = \{\tilde{x}_i \mid d_{ij} <= r\}_{i=1}^{M}$$

where $d_{ij}$ represents a distance between point $x_i(a_i, b_i, c_i)$ and point $x_j(a_j, b_j, c_j)$:

$$d_{ij} = \|x_i - x_j\|_2^2 = \sqrt{(a_i - a_j)^2 + (b_i - b_j)^2 + (c_i - c_j)^2}$$

where $\|\cdot\|_2^2$ represents a distance between two points, and is also referred to as an L2 distance;

step (3.1.2), in order to reduce an amount of computation and effectively adjust an parameter in the network, it is guaranteed the number of point clouds in each neighborhood consistent through sampling control, as shown in FIG. 2, $\mathbb{X}$ is obtained by performing sam(•) sampling on $\tilde{X}$, the number of neighborhood point clouds is set as N, a down-sampling operation is performed under the condition that the number of neighborhood point clouds is greater than N, and N points are randomly extracted from the neighborhood as network inputs; and an up-sampling operation is performed under the condition that the number of neighborhood point clouds is less than N, an origin $x_i$ is filled, and the number of point clouds is caused to be N:

$$\mathbb{X} = sam(\tilde{X})$$

step (3.2), as shown in FIG. 2, the feature extraction module computes a rotation matrix with principal component analysis (PCA), aligns a point cloud, and guarantees invariance of the network; where the invariance of the network means translation invariance, rotation invariance and scale invariance;

the translation invariance means that coordinates of each point are changed by translating the point cloud, but the point cloud may still be identified by the network as the same set of point cloud;

the rotation invariance means that coordinates of each point are changed by rotating the point cloud, but the point cloud may still be identified by the network as the same set of point cloud;

the scale invariance means that coordinates of each point are changed by scaling the point cloud, but the point cloud may still be identified by the network as the same set of point cloud;

PCA may compute mutually orthogonal directions according to a variance of the point cloud, the directions are also referred to as main directions, the greater the projection variance of the input point cloud on a base is, the more information the base will retain, and a base vector with a maximum information storage capacity must be a feature vector of a covariance matrix; where the feature vector means three directions with a maximum projection variance of the point cloud, and may be used as a main feature component of the point cloud;

step (3.2.1), the covariance matrix C is obtained by computing a mean value $(\bar{a}, \bar{b}, \bar{c})$ of coordinates $(a_i, b_i, c_i)$ of each point $x_i$ in $\mathbb{X}$:

$$C = \begin{bmatrix} \sum(a_i - \bar{a})^2 & \sum(a_i - \bar{a})(b_i - \bar{b}) & \sum(a_i - \bar{a})(c_i - \bar{c}) \\ \sum(b_i - \bar{b})(a_i - \bar{a}) & \sum(b_i - \bar{b})^2 & \sum(b_i - \bar{b})(c_i - \bar{c}) \\ \sum(c_i - \bar{c})(a_i - \bar{a}) & \sum(c_i - \bar{c})(b_i - \bar{b}) & \sum(c_i - \bar{c})^2 \end{bmatrix}$$

step (3.2.2), $v_1$, $v_2$ and $v_3$ are computed by performing singular value decomposition (SVD) on C, where the three feature vectors are orthogonal to each other and are the three directions with the maximum projection variance, and the feature vectors form the rotation matrix R, such that point clouds with different rotation angles are aligned in one direction, and the rotation invariance of the network is achieved:

$$R = [v_1, v_2, v_3]$$

where SVD is used to decompose the matrix, and a matrix element that represents an essential change of the matrix may be obtained;

step (3.3), as shown in FIG. 2, in order to strengthen the anti-noise performance of the network, $x_{\sigma_i}$ is obtained by adding multiscale noise perturbation to an input point cloud x, and data are processed with perturbation signals separately, where an output of the network is a weighted result of different noise scale processing; and $$\hat{x} = \sum_{i=1}^{L} \lambda(i) * f(x_{\sigma_i}), x_{\sigma_i} \sim x + N(0, \sigma_i^2 I)$$

where $N(0, \sigma^2 I)$ represents orthonormal distribution with a mean value of 0 and a standard deviation of $\sigma$, $\sim$ represents obedience and $\Sigma$ represents a summation symbol, f(•) represents an output of a denoising result $\hat{x}$ by a trained network, and $\lambda$(•) represents a weighted value and $\lambda(i) = \sigma_i^2$;

step (3.4), limitation of a linear mode is overcome by adding several hidden layers, the data are mapped to different dimensions through multi-layer perceptron (MLP) of shared parameters in FIG. 2 to help the network extract the point cloud feature, and a potential feature of the point cloud is finally obtained through convolution.

in step (3.4), sharing may reduce a training parameter of the network, MLP includes five convolutional layers and five batch normalization (BN) layers, the point cloud data with a dimension of 500*3 are input by using ReLU as an activation function, and after convolution, a global feature with a dimension of 500*1024 is output; where each convolutional layer in a convolutional neural network are composed of several convolution units, a parameter of each convolution unit is optimized through a backpropagation algorithm, a convolution operation is to extract different features input, a first convolutional layer may merely extract some low-level features such as an edge, a line and an angle, and a multi-layer network may iteratively extract more complex features from the low-level feature;

a convolution kernel is a function for defining a weighted value in the case that under the condition of image processing, an input image is given, a pixel in a small area of the input image becomes a corresponding pixel of an output image after being weighed and averaged;

the BN layer normalizes the input data in order to prevent data distribution in a middle layer from changing, completes a normalization operation by computing a sample mean value and a sample variance and introducing a weight coefficient and a paranoia coefficient, can accelerate a training speed of the network, improve a generalization capacity of the network, and disrupt a training order of samples; and the activation function is a function running on a neuron of an artificial neural network, is responsible for mapping an input of the neuron to an output terminal, and is used for outputting a hidden neuron, and is very important for a neural network model to learn and understand a complex function, and ReLU may output a nonlinear result for the neuron after linear transformation; and step (3.4) includes:

step (3.4.1), a feature with a dimension of 500*64 is output through 64 1*1 convolutions and the ReLU activation function, and the normalization is performed through the BN layer;

step (3.4.2), a feature with a dimension of 500*128 is output through 128 1*1 convolutions and the ReLU activation function, and the normalization is performed through the BN layer;

step (3.4.3), a feature with a dimension of 500*256 is output through 256 1*1 convolutions and the ReLU activation function, and the normalization is performed through the BN layer;

step (3.4.4), a feature with a dimension of 500*512 is output through 512 1*1 convolutions and the ReLU activation function, and the normalization is performed through the BN layer; and step (3.4.5), a feature h is output with a dimension of 500*1024 through 1024 1*1 convolutions and the ReLU activation function, and the normalization is performed through the BN;

step 4: the displacement prediction module iteratively learns the displacement of the noise point according to a feature obtained by the feature extraction unit; and as shown in FIG. 3, a displacement prediction module first aggregates features of each point through maximum pooling, then regresses to a predicted displacement $\hat{n}$ of the noise point through Decoder, and finally completes the denoising process by making a predicted point $\hat{x}$ close to a noise-free point y through iterative learning according to a score S (x) predicted by the score estimation unit:

$$\{x_i + \hat{n}_i\}_{i=1}^M = \{\hat{x}_i\}_{i=1}^M \rightarrow \{y_i\}_{i=1}^M$$

where Decoder includes a MAXpooling layer and three fully connected layers (FC), in the FC, each node is connected to all nodes of an upper layer, the FC is used to combine features extracted previously, and due to a fully connected feature thereof, the fully connected layer generally have most parameters;

step 4 includes:

step (4.1), the extracted global feature h of 500*1024 is compressed and aggregated through MAX pooling to obtain a potential feature with a dimension of 1*1024; where the MAX pooling takes a point with a maximum value in a local acceptance domain, and extracts a corresponding strongest part of the feature to enter a next layer, and the MAX pooling may compress the feature and further enhance the translation invariance, the rotation invariance and the scale invariance;

step (4.2), as shown in FIG. 3, regressing to the predicted displacement $\hat{n}$ of the noise point is performed from the potential feature through three FCs, where the FC uses BN regularization and a ReLU activation function, and a last layer uses a tan h activation function for restricting $\hat{n}$ at to obtain the predicted point $\hat{x}$; where the tan h activation function is also referred to as a hyperbolic tangent activation function, has an output mean value of 0, and has a convergence speed faster than a convergence speed of a classical activation function;

step (4.2.1), a vector with a dimension of 1*512 is output through an FC with 512 neurons and the ReLU activation function, and normalization is performed through the BN layer;

step (4.2.2), a vector with a dimension of 1*256 is output through an FC with 256 neurons and the ReLU activation function, and normalization is performed through the BN layer; and step (4.2.3), a vector with a dimension of 1*3 is output through an FC with 3 neurons and the tan h activation function, where the vector is the displacement $\hat{n}$ of the noise point predicted by the network;

step (4.3), a denoising effect of the point cloud is achieved by making the predicted point $\hat{x}$ close to the noise-free point y through iterative learning according to the score S (x) predicted by the score estimation unit:

$$\{x_i + \hat{n}_i\}_{i=1}^M = \{\hat{x}_i\}_{i=1}^M \rightarrow \{y_i\}_{i=1}^M$$

step (4.3.1), with reference to FIG. 4, a concept of the distribution score S (x) of a point cloud and a score of noisy point cloud distribution predicted by the score estimation unit are defined, where the score is a gradient of a logarithmic probability function of the point cloud, and may reflect a direction of point cloud denoising on a local basis:

$$S(x) = \nabla_x \log[(p*n)(x)]$$

where (p*n)(x) represents a score of the point cloud or a probability function of the point cloud, $\nabla$ represents a function gradient taking sign, and log[(p*n)(x)] represents the logarithmic probability function of the point cloud; and (p*n)(x) may measure a noise level of the point cloud, and under the condition that (p*n)(x) reaches a maximum value, the noise point is closest to a clean surface, that is, x is just on the clean surface under the condition that $\nabla_x \log[(p*n)(x)]$ equals 0; and step (4.3.2), inputting, by the score estimation unit, an aggregated feature F composed of a sampling neighborhood $\mathbb{X}$ of x and the global feature h, and outputting the score S (x) of x;

with reference to FIG. 5, the score estimation unit is mainly composed of four residual blocks (ResBlock) and a final convolutional layer (Conv), and an connection of convolution processing of an input layer is added after each residual block to solve the problems such as gradient vanishing and gradient explosion; where the residual block (ResBlock) is composed of two convolutional layers and a shortcut connection, and the shortcut connection refers to a shortcut connecting an input to an output, and is equivalent to execution of equivalent mapping without generating an additional parameter; and step (4.3.2.1), an actual target score s(x) of an input point x is defined by using a noise-free point cloud Y, and s(x) is defined as a vector from the noise point x to a clean surface:

$$s(x) = NN(x, Y) - x, x \in \mathbb{X}$$

where NN(x, Y) regresses to a point closest to x in Y; and the actual target score refers to an actual score pursued by the score estimation unit, and the predicted score output by the score estimation unit keeps approaching the actual score with training;

step (4.3.2.2), determines an objective function of the score estimation unit, and a training objective function aligns the predicted score S(x) with the actual target score s(x) defined above:

$$\mathcal{L}^{(i)} = \mathbb{E}_{x \sim N(x_i)}\left[\|s(x) - S(x)\|_2^2\right]$$

where $\mathbb{E}$ represents a mathematical expectation; and $N(x_i)$ represents distribution of a neighborhood point cloud of a $i^{th}$ point $x_i$, and means that the objective function not only matches a score predicted in the position $x_i$, but also matches a score in the neighborhood of $x_i$, and therefore helps a prediction process of the network cover a neighborhood of each point; and step (4.3.2.3), in order to enhance robustness and reduce a deviation, a local neighborhood score function $\varepsilon(x)$ is constructed with an integrated score function;

$$\varepsilon(x) = \frac{1}{N}\sum_{j=1}^{N} S_j(x), x_j \in \mathbb{X}$$

where $S(x_j)$ represents a score of a $j^{th}$ point $x_j$ in a point cloud neighborhood $\mathbb{X}$;

step 5: a loss function of network training is defined, and convergence is completed under the condition that the loss function reaches a set threshold or a maximum number of iterations; and the step includes:

step (5.1), a displacement acting on the noise point is finally predicted by the network, and a loss function of $L_s$ is defined to make the noisy point cloud closer to a clean surface according to a feature of a distance L2, where the loss is the L2 distance between a point closest to a predicted point and the predicted point in a noise-free point cloud; and $$L_s = \|NN(\hat{x}, Y) - \hat{x}\|_2^2$$

step (5.2), a new loss function $L_a$ weighted by a local neighborhood score $\varepsilon(x)$ is defined, and a denoising process is shown in FIG. 6, the denoising effect is measured from distribution of the point cloud neighborhood rather than merely from a distance of a single point, and therefore distribution of a denoised point cloud is caused more uniform and accurate;

$$L_a = \alpha L_s + (1-\alpha)\sqrt{\varepsilon_x^2 + \varepsilon_y^2 + \varepsilon_z^2}$$

where $L_a$ represents a weighted combination of two loss terms, the local neighborhood score $\varepsilon(x)$ actually predicts a gradient of point cloud distribution, the gradient is a three-dimensional vector, and $$\sqrt{\varepsilon_x^2 + \varepsilon_y^2 + \varepsilon_z^2}$$

is obtained module $\varepsilon(x)$;

In this example, denoising effects of other point cloud denoising methods and the method of the present present invention are compared and analyzed, and practical applicability of the method is verified as follows:

Step 1: Six Kinds of Point Cloud Models are Defined.
  Clean: an untreated clean point cloud model;
  Noisy(0.5%): a noisy point cloud model obtained by adding 0.5% Gaussian noise to the clean point cloud model, and effects of the denoising methods are compared by denoising the noisy model;
  TotalDenosing(TD): TD is a point cloud denoising network based on unsupervised learning, predicts a value of a noise-free point by learning from a neighborhood point cloud, and changes a sampling mode of the point by introducing a prior term;
  PointCleanNet: PointClean decomposes a denoising task into removal of an outlier and learning of an offset;
  Point filter: Point filter is a network composed of an encoder and a decoder, and projects each noise point to a basic surface according to an adjacent structure of the point cloud; and
  MSpoint: the denoising method based on a multi-scale distribution score for a point cloud according to the present invention.

Step 2: An Experimental Data Set
The present invention uses a public point cloud data set of Stanford to verify practicability of the method, and each point cloud model is generated by randomly sampling 100,000 points from a clean surface as a noise-free point cloud data set. A corresponding noisy model is synthesized by adding Gaussian noise with an average value of 0, and a degree of noise is determined by a diagonal length of a noise-free point cloud bounding box. For example, 0.5% noise means adding Gaussian noise with a standard deviation of 0.5% diagonal length of the point cloud bounding box. Three point cloud models (cube, casting and fandisk) in the data set are used as verification sets for control experiments, and other point cloud models are used as training sets.

Figure 7:
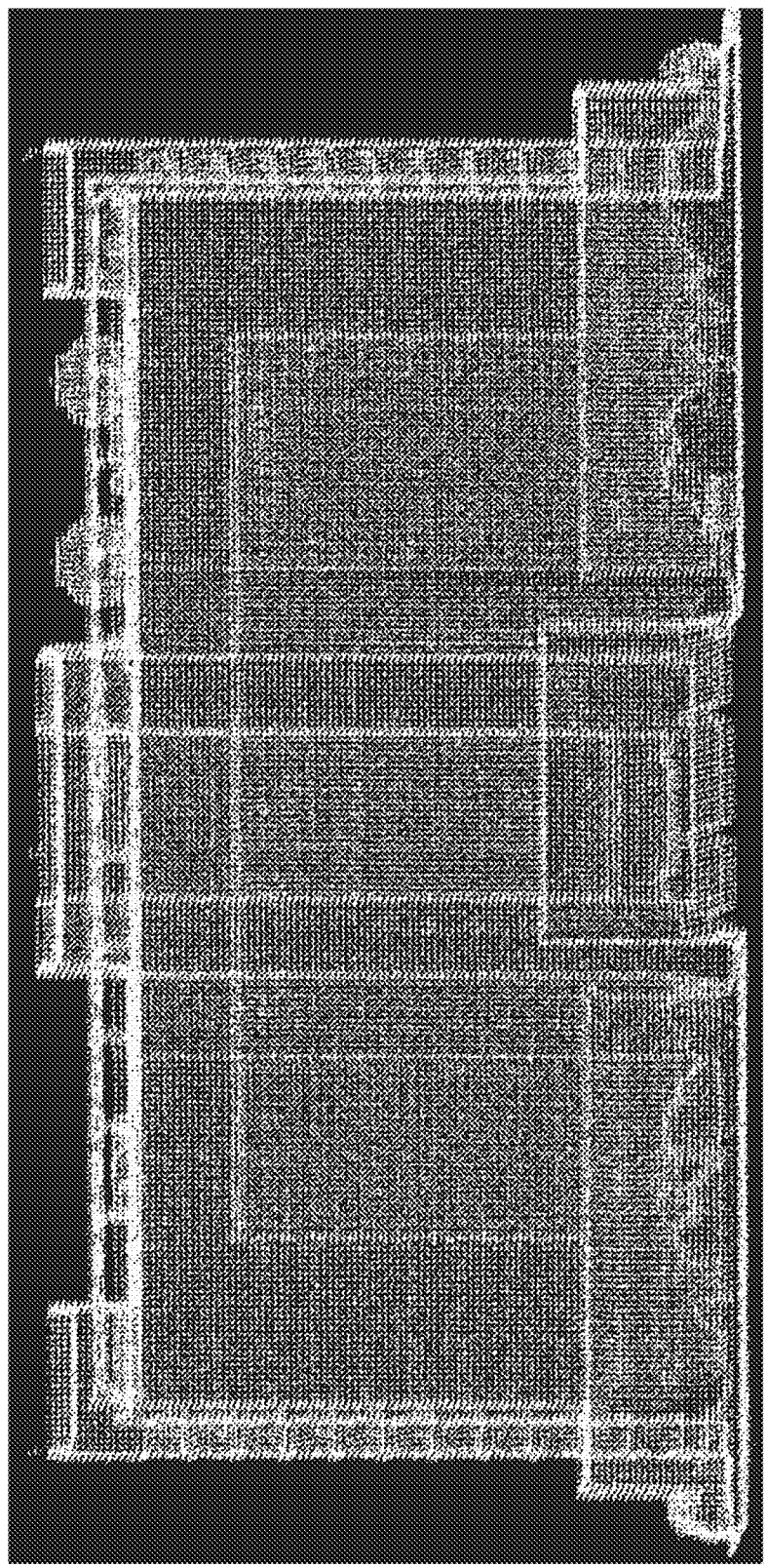
FIG. 7 shows a point cloud model actually collected of a certain building.

The practical applicability of the present invention is verified by denoising an actually collected original point cloud model. Point cloud data of a building are collected through unmanned airborne lidar, and an obtained point cloud model is as shown in FIG. 7, and is composed of 21,358,741 points.

Step 3: An Evaluation Index is Defined.
The present invention uses an point-to-surface (P2F) error to comprehensively measure the denoising effect, and the P2F error can accurately reflect a deviation degree of the point cloud relative to the clean surface.

The smaller the P2F error is, the closer a predicted point cloud is to the noise-free point cloud, and the better a denoising performance is.

Step 4: A Comparison Result is Evaluated.
FIG. 8 shows an experimental result of quantitative evaluation based on the public data set of Stanford, where Gaussian noise is a noise level of the model and Noisy is the P2F error of the unprocessed point cloud model. It can be seen that MSPoint is obviously superior to other denoising networks in the term of P2F error.

Figure 9:
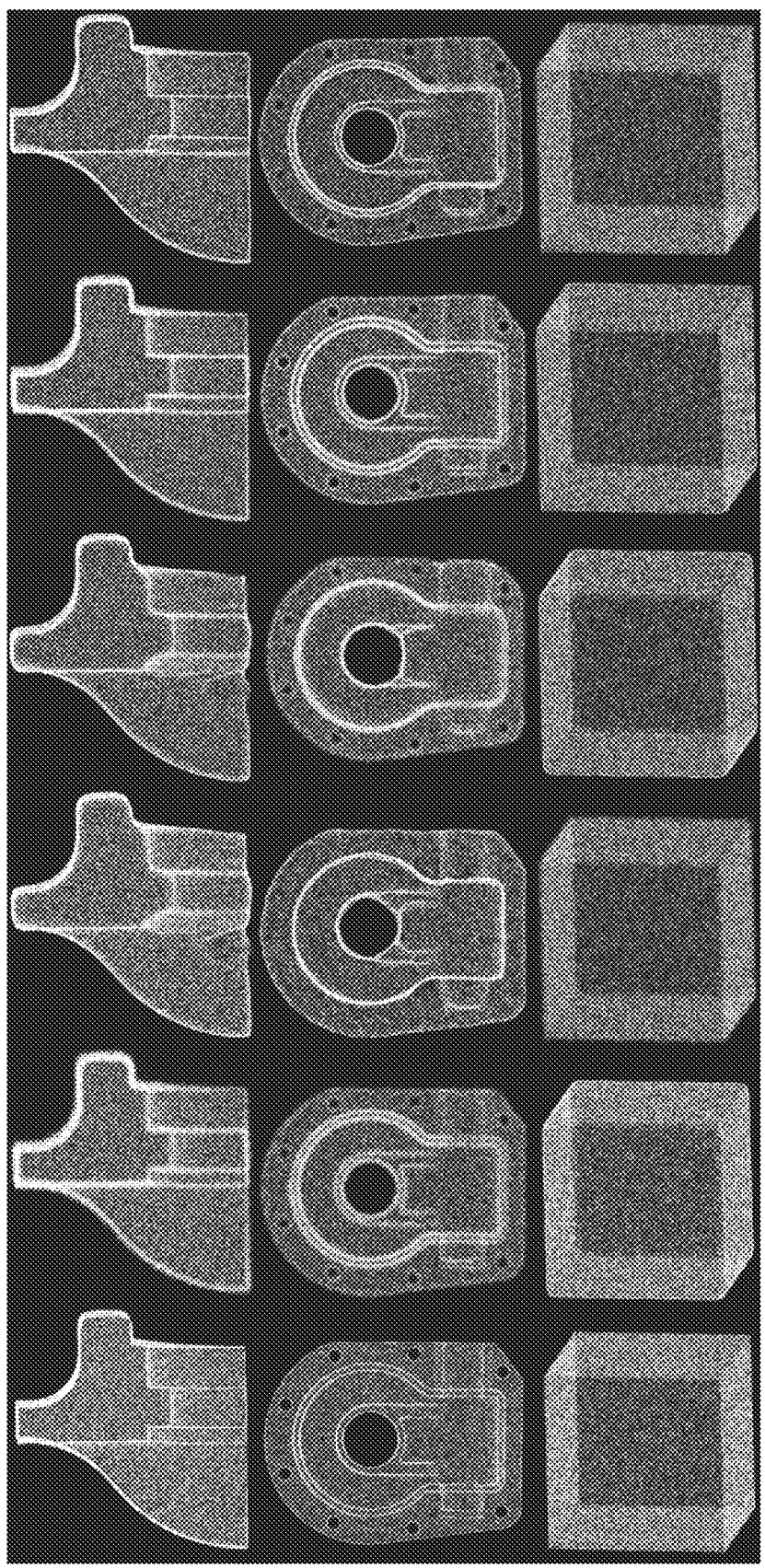
FIG. 9 shows a comparison of denoising results of a point cloud through MSPoint and other methods.

FIG. 9 shows a comparison of denoising effects of various methods when adding 0.5% noise to the clean point cloud, where (a) represents Clean, that is, a clean point cloud model; (b) represents Noisy, that is, a noisy point cloud without noise reduction; (c) represents TD, that is, a point cloud denoising network based on unsupervised learning, predicts a value of a noise-free point by learning from a neighborhood point cloud, and changes a sampling mode of the point by introducing a prior term; (d) represents Point-ClenNet, that is, a point cloud denoising network that decomposes a denoising task into removal of an outlier and learning of an offset; (e) represents Pointfilter, that is, a network consisting of an encoder and a decoder, and projects each noise point to a basic surface according to an adjacent structure of the point cloud; (f) represents MSPoint, that is, the present present invention. It can be seen that when denoising different types of point clouds, MSPoint has the best denoising effect, can not only retain a sharp feature of the point cloud, but also make a geometric feature of the point clouds clearer than other algorithms after denoising, and is free of excessive smoothness.

Step 5: Practical Applicability of MSPoint is Verified.

Figure 10:
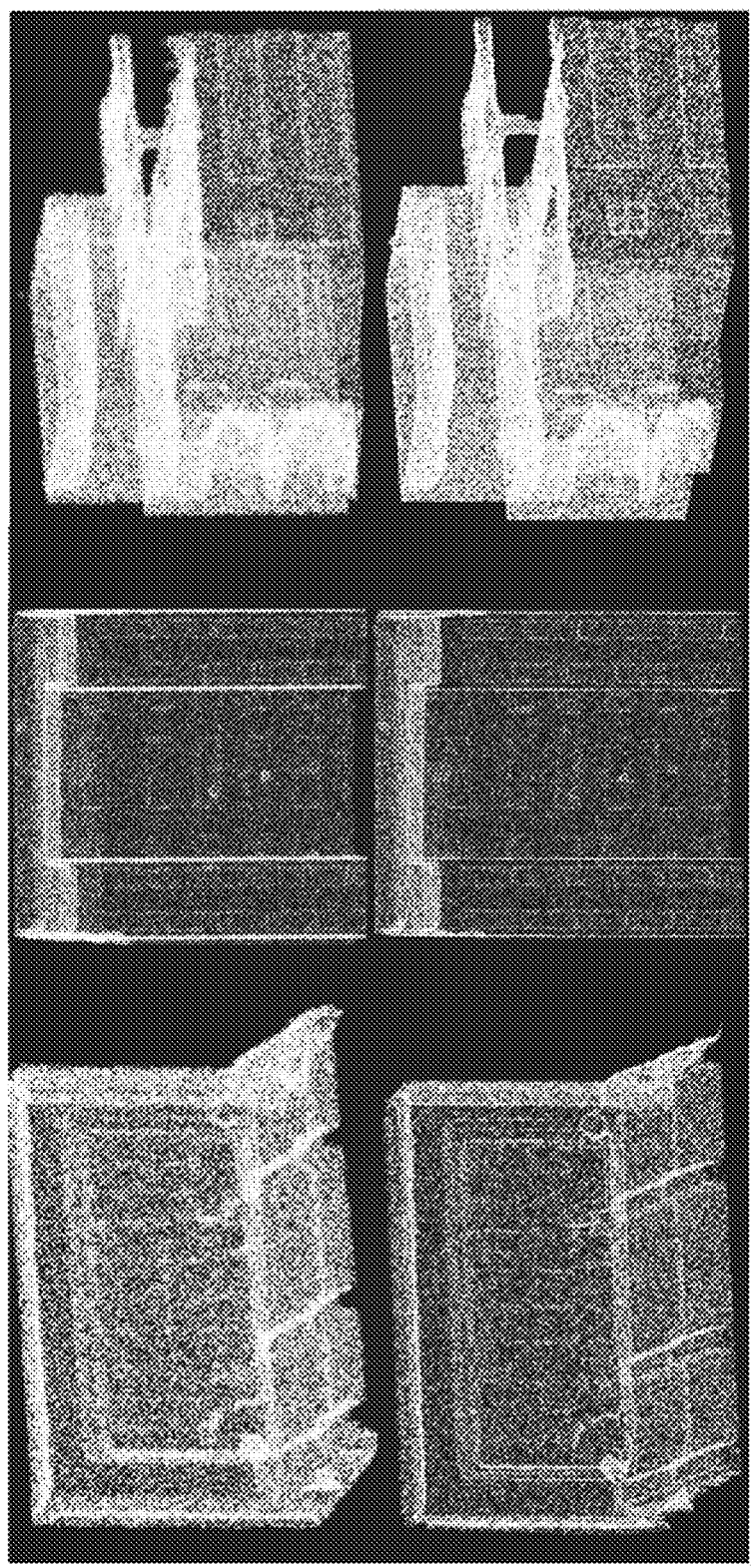
FIG. 10 shows a comparison of an actual point cloud model before and after local denoising.

FIG. 10 shows a comparison of a local denoising effect of an actual point cloud model. It can be seen that MSPoint has a considerable denoising effect on the actually collected point cloud model and has desirable practical applicability.

What is described in the example of the description is merely enumeration of the implementation forms of the inventive concept, and is merely illustrative. The protection scope of the present invention should not be regarded as limited to specific forms stated in this example, and the protection scope of the present invention shall cover equivalent technical means that are conceivable by those skilled in the art according to the concept of the present invention.

What is claimed is:

1. A denoising method based on a multiscale distribution score for a point cloud, comprises:
    step 1: constructing a two-layer network model, wherein the two-layer network model comprises a feature extraction module for extracting a feature of the point cloud and a displacement prediction module for predicting a displacement of a noise point;
    step 2: constructing a point cloud noise model for improving a denoising effect and retaining a sharp feature and avoiding reducing quality of point cloud data;
    step 3: extracting a global feature h by inputting the point cloud data into the feature extraction module, wherein preprocessing the point cloud data, enhancing an anti-noise performance of a network by adding multiscale noise perturbation to processed point cloud data, and extracting, with Encoder, the global feature h of the point cloud by the feature extraction module;
    step 4: iteratively learning the displacement of the noise point by the displacement prediction module according to a feature obtained by the feature extraction module; and
    step 5: defining a loss function of network training, and completing convergence in response to the loss function reaches a set threshold or a maximum number of iterations;
    wherein the step 1 further comprises:
    preprocessing a neighborhood of an input noisy point cloud by the feature extraction module, and the anti-noise performance of the network is enhanced through the multiscale noise perturbation;
    wherein a displacement estimation module of the displacement prediction module obtains a distribution score of a neighborhood point cloud according to a score estimation unit, considers a position of each point, further covers a neighborhood of the point, and finally completes a denoising process by iteratively learning the displacement of the noise point; wherein
    wherein the neighborhood point cloud refers to a set of data that have a distance less than a specific distance from a selected point in current point cloud data;
    wherein the point cloud distribution refers to that point clouds scattered in a certain area obey a distribution function, wherein the distribution function shows statistical regularity of a random point cloud;
    wherein the multiscale noise perturbation refers to use of multiscale isotropic Gaussian noise with a mean value of 0 to interfere with the data.

2. The denoising method based on the multiscale distribution score for the point cloud according to claim 1, wherein the step 2 further comprises:
    step (2.1), regarding in the present invention a noise-free point cloud $Y=\{y_i\}_{i=1}^{M}$ as a set of samples p(y) of three-dimensional distribution p supported by a two-dimensional manifold, deducing $p(y) \to \infty$ in response to the noise point y is just on the two-dimensional manifold, assuming that noise follows distribution n, and modeling the noisy point cloud $X=\{x_i\}_{i=1}^{M}$ as shown in the following formula to reduce the number of point clouds in the denoising process:

$$X = \{x_i = y_i + n_i\}_{i=1}^{M}$$

wherein M represents the number of point clouds, $n_i$ represents a component of noise distribution n, $x_i$ represents a component of a noisy point cloud X, and $y_i$ represents a component of s noise-free point cloud Y;
    wherein the two-dimensional manifold refers to a compact topological space in a two-dimensional space, and each point in the topological space is an interior point; and
    step (2.2), representing a probability density function q(x) of the noisy point cloud X as a convolution (p*n)(x) between a point cloud distribution p and the noise distribution n, and simultaneously taking derivatives of both distributions, wherein in response to n equals 0, a noise-free point cloud Y from a noise-free distribution p is just located at q:

$$q(x) := (p*n)(x) = \int p(y)n(x-y)dy$$

wherein the probability density function of the noisy point cloud represents a probability that the noise point falls within a certain specified range;
    wherein the convolution is a mathematical operation to generate a third function from two functions, and the convolution is a special integral transformation.

3. The denoising method based on the multiscale distribution score for the point cloud according to claim 1, wherein the step 3 further comprises:
    step (3.1), preprocessing collected point cloud data to make a format directly processed by a neural network;

step (3.2), computing a rotation matrix with principal component analysis (PCA), aligning a point cloud;

step (3.3), obtaining $x_{\sigma_i}$ by adding multiscale noise perturbation to an input point cloud x, and processing data with perturbation signals separately, wherein an output of the network is a weighted result of different noise scale processing; and step (3.4), overcoming limitation of a linear mode by adding several hidden layers, extracting the point cloud feature by the network through mapping the data to different dimensions through multi-layer perceptron (MLP) of shared parameters, and obtaining a potential feature of the point cloud through a convolution.

4. The denoising method based on the multiscale distribution score for the point cloud according to claim 3, wherein the step (3.1) further comprises:

step (3.1.1), considering that a denoising problem of the point cloud is regarded as a local problem, a denoising result of any noise point $x_i$ comes from a local neighborhood $\tilde{X}$ of the point, and a distance between $\tilde{X}$ and $x_i$ does not exceed a given neighborhood radius r:

$$\tilde{X} = \{\tilde{x}_i \mid d_{ij} <= r\}_{i=1}^{M}$$

wherein $d_{ij}$ represents a distance between point $x_i(a_i, b_i, c_i)$ and point $x_j(a_j, b_j, c_j)$:

$$d_{ij} = \|x_i - x_j\|_2^2 = \sqrt{(a_i - a_j)^2 + (b_i - b_j)^2 + (c_i - c_j)^2}$$

wherein $\|\cdot\|_2^2$ represents a distance between two points, and is also referred to as an L2 distance;

step (3.1.2), guaranteeing the number of point clouds in each neighborhood consistent through sampling control, obtaining $\mathbb{X}$ by performing sam(•) sampling on $\tilde{X}$, setting the number of neighborhood point clouds as N, performing a down-sampling operation in response to the number of neighborhood point clouds is greater than N, and randomly extracting N points from the neighborhood as network inputs; and performing an up-sampling operation in response to the number of neighborhood point clouds is less than N, filling an origin $x_i$, and causing the number of point clouds to be N:

$$\mathbb{X} = \text{sam}(\tilde{X});$$

wherein in the step (3.2), the invariance of the network means translation invariance, rotation invariance and scale invariance, the translation invariance means that coordinates of each point are changed by translating the point cloud, and the point cloud is still identified by the network as the same set of point cloud; the rotation invariance means that coordinates of each point are changed by rotating the point cloud, and the point cloud is still identified by the network as the same set of point cloud; the scale invariance means that coordinates of each point are changed by scaling the point cloud, and the point cloud is still identified by the network as the same set of point cloud; and a feature vector means three directions with a maximum projection variance of the point cloud, and is used as a main feature component of the point cloud, and the step (3.2) further comprises:

step (3.2.1), obtaining a covariance matrix C by computing a mean value (a, b, c) of coordinates ($a_i$, $b_i$, $c_i$) of each point $x_i$ in $\mathbb{X}$:

$$C = \begin{bmatrix} \sum(a_i - \overline{a})^2 & \sum(a_i - \overline{a})(b_i - \overline{b}) & \sum(a_i - \overline{a})(c_i - \overline{c}) \\ \sum(b_i - \overline{b})(a_i - \overline{a}) & \sum(b_i - \overline{b})^2 & \sum(b_i - \overline{b})(c_i - \overline{c}) \\ \sum(c_i - \overline{c})(a_i - \overline{a}) & \sum(c_i - \overline{c})(b_i - \overline{b}) & \sum(c_i - \overline{c})^2 \end{bmatrix}$$

step (3.2.2), computing $v_1$, $v_2$ and $v_3$ by performing singular value decomposition (SVD) on C, wherein the three feature vectors are orthogonal to each other and are the three directions with the maximum projection variance, and the feature vectors form the rotation matrix R, such that point clouds with different rotation angles are aligned in one direction, and the rotation invariance of the network is achieved:

$$R = [v_1, v_2, v_3]$$

wherein SVD is used to decompose the matrix, and a matrix element that represents an essential change of the matrix can be obtained;

wherein in the step (3.3), the output of the network is the weighted result of different noise scale processing:

$$\hat{x} = \sum_{i=1}^{L} \lambda(i) * f(x_{\sigma_i}),$$

$$x_{\sigma_i} \sim x + N(0, \sigma_i^2 I)$$

wherein $N(0, \sigma^2 I)$ represents orthonormal distribution with a mean value of 0 and a standard deviation of σ, ~ represents obedience and Σ represents a summation symbol, f(•) represents an output of a denoising result $\hat{x}$ by a trained network, and λ(•) represents a weighted value and $\lambda(i) = \sigma_i^2$;

wherein in the step (3.4), sharing can reduce a training parameter of the network, MLP comprises five convolutional layers and five batch normalization (BN) layers, the point cloud data with a dimension of 500*3 are input by using ReLU as an activation function, and after convolution, a global feature with a dimension of 500*1024 is output;

wherein each convolutional layer in a convolutional neural network are composed of several convolution units, a parameter of each convolution unit is optimized through a backpropagation algorithm, a convolution operation is to extract different features input, a first convolutional layer can merely extract some low-level features such as an edge, a line and an angle, and a multi-layer network can iteratively extract more complex features from the low-level feature;

wherein a pixel in a small area of an input image is weighed by a weighted value and averaged to obtain a corresponding pixel of an output image, wherein the weighted value is defined by a convolution kernel;

wherein the BN layer normalizes the input data in order to prevent data distribution in a middle layer from changing, completes a normalization operation by computing a sample mean value and a sample variance and introducing a weight coefficient and a paranoia coefficient, can accelerate a training speed of the network, improve a generalization capacity of the network, and disrupt a training order of samples; and wherein the activation function is a function running on a neuron of an artificial neural network, is responsible for mapping an input of the neuron to an output terminal, and is used for outputting a hidden neuron, and is very important for a neural network model to learn and understand a complex function, and ReLU can output a nonlinear result for the neuron after linear transformation; and the step (3.4) further comprises:

step (3.4.1), outputting a feature with a dimension of 500*64 through 64 1*1 convolutions and the ReLU activation function, and performing normalization through the BN layer;

step (3.4.2), outputting a feature with a dimension of 500*128 through 128 1*1 convolutions and the ReLU activation function, and performing the normalization through the BN layer;

step (3.4.3), outputting a feature with a dimension of 500*256 through 256 1*1 convolutions and the ReLU activation function, and performing the normalization through the BN layer;

step (3.4.4), outputting a feature with a dimension of 500*512 through 512 1*1 convolutions and the ReLU activation function, and performing the normalization through the BN layer; and step (3.4.5), outputting a feature h with a dimension of 500*1024 through 1024 1*1 convolutions and the ReLU activation function, and performing the normalization through the BN layer.

5. The denoising method based on the multiscale distribution score for the point cloud according to claim 1, wherein in the step 4, aggregating features of each point through maximum pooling by the displacement prediction module, regressing a predicted displacement n̂ of the noise point through a decoder, and completing the denoising process by making a predicted point x̃ close to a noise-free point y through iterative learning according to a score S (x) predicted by the score estimation unit:

$$\{x_i + \hat{n}_i\}_{i=1}^{M} = \{\hat{x}_i\}_{i=1}^{M} \rightarrow \{y_i\}_{i=1}^{M}$$

wherein the decoder comprises a MAX pooling layer and three fully connected layers (FC), in the FC, each node is connected to all nodes of an upper layer, the FC is used to combine features extracted previously, and due to a fully connected feature thereof, the fully connected layer generally has most parameters;

wherein the step 4 comprises:

step (4.1), compressing and aggregating the extracted global feature h of 500*1024 through MAX pooling to obtain a potential feature with a dimension of 1*1024, wherein the MAX pooling takes a point with a maximum value in a local acceptance domain, and extracts a corresponding strongest part of the feature to enter a next layer, and the MAX pooling can compress the feature and further enhance the translation invariance, the rotation invariance and the scale invariance;

step (4.2), regressing to the predicted displacement n̂ of the noise point from the potential feature through three FCs, wherein the FC uses BN regularization and a ReLU activation function, and a last layer uses a tanh activation function for restricting n̂ to obtain the predicted point; and step (4.3), achieving a denoising effect of the point cloud by making the predicted point x̃ close to the noise-free point y through iterative learning according to the score S (x) predicted by the score estimation unit.

6. The denoising method based on the multiscale distribution score for the point cloud according to claim 5, wherein in the step (4.2), the tanh activation function is an output mean value of 0, and has a convergence speed faster than a convergence speed of a classical activation function, and the step (4.2) further comprises:

step (4.2.1), outputting a vector with a dimension of 1*512 through an FC with 512 neurons and the ReLU activation function, and performing normalization through a BN layer;

step (4.2.2), outputting a vector with a dimension of 1*256 through an FC with 256 neurons and the ReLU activation function, and performing normalization through the BN layer; and step (4.2.3), outputting a vector with a dimension of 1*3 through an FC with 3 neurons and the tanh activation function, wherein the vector is the displacement of the noise point predicted by the network.

7. The denoising method based on the multiscale distribution score for the point cloud according to claim 5, wherein the denoising effect of the point cloud in the step (4.3) is as follows:

$$\{x_i + \hat{n}_i\}_{i=1}^{M} = \{\hat{x}_i\}_{i=1}^{M} \rightarrow \{y_i\}_{i=1}^{M}$$

wherein the step (4.3) further comprises:

step (4.3.1), defining a concept of the score S (x), and a score of noisy point cloud distribution predicted by the score estimation unit, wherein the score is a gradient of a logarithmic probability function of the point cloud, and the score S (x) is as follows:

$$S(x) = \nabla_x \log[(p*n)(x)]$$

wherein (p*n)(x) represents a score of the point cloud or a probability function of the point cloud, ∇ represents a function gradient taking sign, and log[(p*n)(x)] represents the logarithmic probability function of the point cloud; and wherein a noise level of the point cloud is measured by (p*n)(x) c, and the noise point is closest to a clean surface in response to (p*n)(x) reaches a maximum value, wherein x is just on the clean surface in response to $\nabla_x \log[(p*n)(x)]$ equals 0; and step (4.3.2), inputting, by the score estimation unit, an aggregated feature F composed of a sampling neighborhood $\mathbb{X}$ of x and the global feature h, and outputting the score S (x) of x.

8. The denoising method based on the multiscale distribution score for the point cloud according to claim 5, wherein preferably, in the step (4.3.2), the score estimation unit is mainly composed of four residual blocks and a final convolutional layer, and an connection of convolution processing of an input layer is added after each residual block; wherein the residual block is composed of two convolutional layers and a shortcut connection, and the shortcut connection refers to a shortcut connecting an input to an output, and is equivalent to execution of equivalent mapping without generating an additional parameter; and wherein the step (4.3.2) further comprises:

step (4.3.2.1), defining an actual target score s(x) of an input point x by using a noise-free point cloud Y, and s(x) is defined as a vector from the noise point x to a clean surface:

$$s(x) = NN(x, Y) - x, x \in \mathbb{X}$$

wherein NN(x, Y) regresses to a point closest to x in Y; and the actual target score refers to an actual score pursued by the score estimation unit, and the predicted score output by the score estimation unit keeps approaching the actual score with training;

step (4.3.2.2), determining an objective function of the score estimation unit, and aligning, by a training objective function, the predicted score S(x) with the actual target score s(x) defined above:

$$\mathcal{L}^{(i)} = \mathbb{E}_{x \sim N(x_i)}\left[\|s(x) - S(x)\|_2^2\right]$$

wherein $\mathbb{E}$ represents a mathematical expectation; and wherein $N(x_i)$ represents distribution of a neighborhood point cloud of a $i^{th}$ point $x_i$, and the objective function matches a score predicted in the position $x_i$, and a score in the neighborhood of $x_i$ to cover a neighborhood of each point during a prediction process of the network; and step (4.3.2.3), constructing a local neighborhood score function ε(x) with an integrated score function;

$$\varepsilon(x) = \frac{1}{N}\sum_{j=1}^{N} S_j(x),$$

$$x_j \in \mathbb{X}$$

wherein $S(x_j)$ represents a score of a $j^{th}$ point $x^j$ in a point cloud neighborhood $\mathbb{X}$.

9. The denoising method based on the multiscale distribution score for the point cloud according to claim 1, wherein the step 5 further comprises:

step (5.1), predicting a displacement acting on the noise point by the network, and defining a loss function of $L_s$ to make the noisy point cloud closer to a clean surface according to a feature of a distance L2, wherein the loss is the L2 distance between a point closest to a predicted point and the predicted point in a noise-free point cloud; and $$L_s = \|NN(\hat{x}, Y) - \hat{x}\|_2^2$$

step (5.2), defining a new loss function $L_a$ weighted by a local neighborhood score ε(x), and measuring the denoising effect from distribution of the point cloud neighborhood rather than merely from a distance of a single point, and therefore causing distribution of a denoised point cloud more uniform and accurate;

$$L_a = \alpha L_s + (1-\alpha)\sqrt{\varepsilon_x^2 + \varepsilon_y^2 + \varepsilon_z^2}$$

wherein $L_a$ represents a weighted combination of two loss terms, the local neighborhood score ε(x) actually predicts a gradient of point cloud distribution, the gradient is a three-dimensional vector, and $\sqrt{\varepsilon_x^2 + \varepsilon_y^2 + \varepsilon_z^2}$ is obtained modulo ε(x).

\* \* \* \* \*